(12) United States Patent
Elliott et al.

(10) Patent No.: US 10,666,465 B1
(45) Date of Patent: May 26, 2020

(54) ADAPTIVE SELECTION OF ISOLATION GROUND FOR DIFFERENTIAL INTERFACE

(71) Applicant: International Business Machines Corporation, Armonk, NY (US)

(72) Inventors: John C. Elliott, Tucson, AZ (US); Gary W. Batchelor, Tucson, AZ (US); Heidi L. Mccook, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/267,202

(22) Filed: Feb. 4, 2019

(51) Int. Cl.
*H04L 25/02* (2006.01)
*H04M 3/18* (2006.01)
*H04L 12/10* (2006.01)

(52) U.S. Cl.
CPC .......... *H04L 25/0266* (2013.01); *H04L 12/10* (2013.01); *H04M 3/18* (2013.01)

(58) Field of Classification Search
CPC .......... H04B 1/16; H04B 10/40; H04B 15/02; H04L 25/0266; H04L 12/10; H04M 3/18
USPC ......................................................... 375/257
See application file for complete search history.

(56) References Cited

U.S. PATENT DOCUMENTS

| | | | |
|---|---|---|---|
| 5,627,898 A | 5/1997 | Washino | |
| 5,747,893 A | 5/1998 | Bennett et al. | |
| 7,423,434 B2 * | 9/2008 | Stancil | G01R 31/045 324/539 |
| 7,595,644 B2 | 9/2009 | Male | |
| 7,701,731 B2 | 4/2010 | Dhuyvetter et al. | |
| 8,184,525 B2 | 5/2012 | Karam | |
| 9,967,104 B2 | 5/2018 | Gardner et al. | |
| 2002/0101294 A1 * | 8/2002 | Wright | H01P 5/10 333/26 |
| 2011/0241445 A1 * | 10/2011 | Teggatz | G06F 1/30 307/127 |
| 2019/0089258 A1 * | 3/2019 | Giuliano | H02M 3/073 |

* cited by examiner

*Primary Examiner* — Leila Malek
(74) *Attorney, Agent, or Firm* — Kunzler Bean & Adamson (57) ABSTRACT

Methods and systems for the adaptive selection of an isolation ground for a differential interface are provided. A system for adaptively selecting an isolation ground for a differential interface includes a first body having a first ground reference. The system additionally includes a second body having a second ground reference. Further, the system includes a differential interface through which the first body communicates electrical signals with the second body. Also, the system includes a common ground connection shared between the first body and second. Moreover, the system includes an adaptive isolation connection that adaptively connects the common ground connection to one of the first ground reference and the second ground reference.

20 Claims, 6 Drawing Sheets

ADAPTIVE SELECTION OF ISOLATION GROUND FOR DIFFERENTIAL INTERFACE

FIELD

This invention relates to electrical communications between logical bodies and more particularly relates to methods and systems for adaptive selection of isolation ground for a differential interface.

BACKGROUND

To send information, an electronic device sends a logical signal to another device. Often, the transmitting device and the receiving device are unable to share a common ground reference voltage. For example, an electronic device may have a logic driver, where the logic driver produces a signal and provides the signal to a connected transceiver. The transceiver may then transmit the signal to another electronic device. The other electronic device may also have a transceiver to receive the signal and provide the signal for processing by a corresponding logic device.

SUMMARY

Methods and systems for the adaptive selection of an isolation ground for a differential interface are provided. A system for adaptively selecting an isolation ground for a differential interface includes a first body having a first ground reference. The system additionally includes a second body having a second ground reference. Further, the system includes a differential interface through which the first body communicates electrical signals with the second body. Also, the system includes a common ground connection shared between the first body and second. Moreover, the system includes an adaptive isolation connection that adaptively connects the common ground connection to one of the first ground reference and the second ground reference.

In certain embodiments, the first body is an enclosure. Also, the second body is an input/output bay. Additionally, the first body includes a first logic driver connected to the first ground reference. Also, the first body includes a first isolated transceiver connected to the differential interface. The first isolated transceiver is isolated from the first ground reference and connected to the common ground connection.

In further embodiments, the second body includes a second logic driver connected to the second ground reference. Moreover, the second body includes a second transceiver that is connected to the common ground connection. Additionally, the second transceiver is a second isolated transceiver that is isolated from the second ground reference. The common ground connection is connected to the adaptive isolation connection within the second body. Alternatively, the common ground connection is connected to the second ground reference and the adaptive isolation connection is disconnected within the second body.

In some embodiments, the differential interface, the common ground connection, and the adaptive isolation connection are part of a cable. Further, the cable may be one of an ethernet cable and a telephone cable. Alternatively, the adaptive isolation connection and the differential interface may be on separate cables.

One method for adaptively selecting an isolation ground for a differential interface includes coupling a first body to a second body through a differential interface. The first body having a first ground reference and the second body having a second ground reference. The method additionally includes connecting a common ground connection between the first body and the second body. Further, the method includes connecting an adaptive isolation connection between the first body and the second body. The adaptive isolation connection adaptively connects the common ground connection to one of the first ground reference and the second ground reference.

In certain embodiments, the first body is an enclosure and the second body is an input/output bay. Further, the method includes coupling a first logic driver in the first body to the first ground reference. Also, the method includes coupling a first isolated transceiver in the first body to the differential interface. Additionally, the method includes isolating the first isolated transceiver from the first ground reference. Moreover, the method includes connecting the first isolated transceiver to the common ground connection.

In some embodiments, the method further includes coupling a second logic driver in the second body to the second ground reference. Additionally, the method includes connecting a second transceiver in the second body to the common ground connection. Also, the method further includes isolating the second transceiver from the second ground reference. Moreover, the method includes connecting the common ground connection to the adaptive isolation connection within the second body. Alternatively, the method includes connecting the common ground connection to the second ground reference. Further, the method includes ensuring that the adaptive isolation connection is disconnected within the second body.

In certain embodiments, the differential interface, the common ground connection and the adaptive isolation connection are part of a cable. Alternatively, the adaptive isolation connection and the differential interface are on separate cables.

A further system for adaptively selecting an isolation ground for a differential interface includes an enclosure having a first ground reference. Additionally, the system includes an input/output bay having a second ground reference. Further, the system includes a differential interface through which the enclosure communicates electrical signals with the input/output bay. Also, the system includes a common ground connection shared between the enclosure and the input/output bay. Moreover, the system includes an adaptive isolation connection that adaptively connects the common ground connection to one of the first ground reference and the second ground reference.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Disclosed herein are various embodiments providing methods, systems, and computer program products that can provide adaptive selection of an isolation ground for a differential interface. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements.

Figure 1:
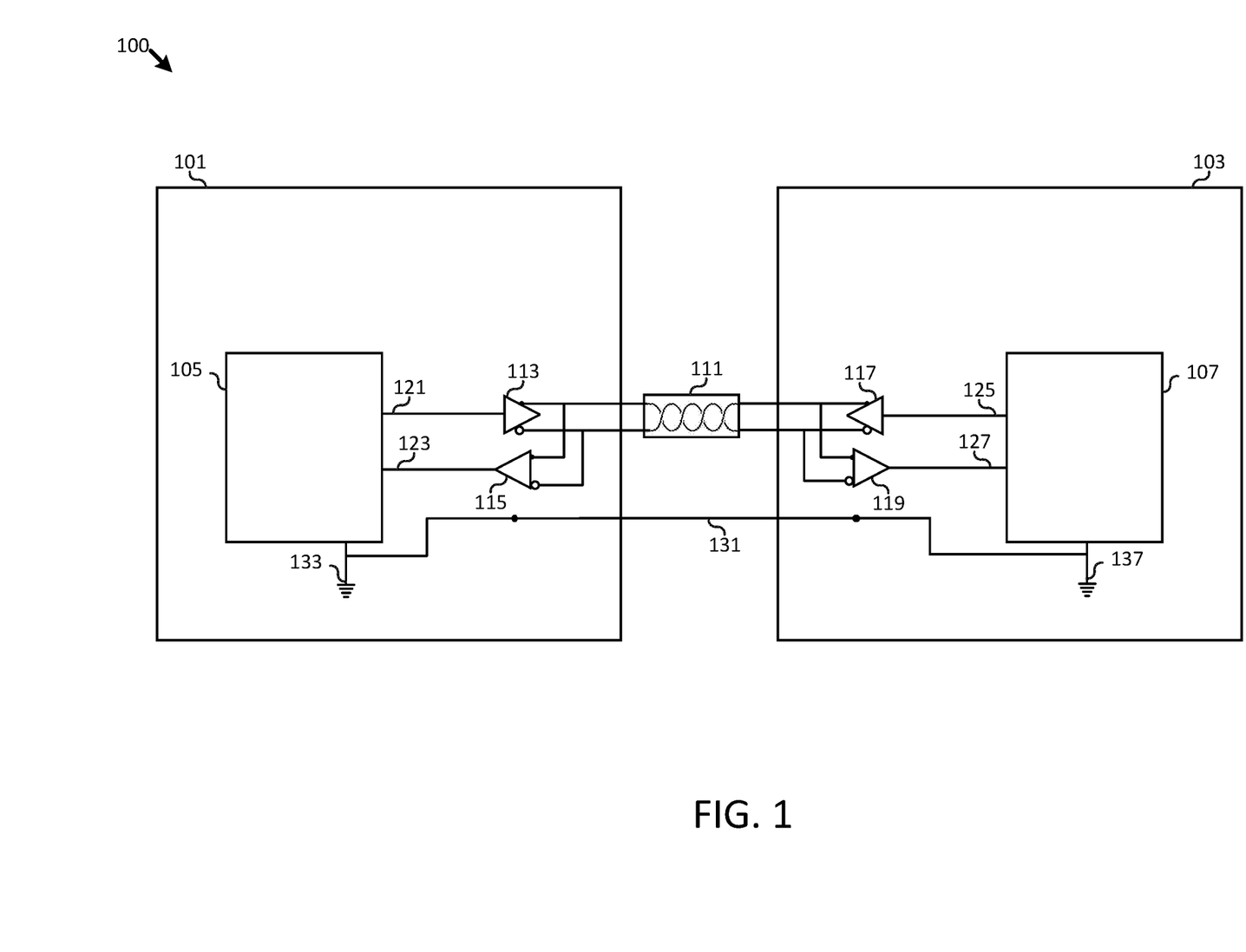
FIG. 1 is a schematic diagram of one embodiment of a system for providing a differential interface with no transceiver isolation.

With reference now to the figures, FIG. 1 is a schematic diagram of a system 100 for providing a non-isolated differential communication interface 111. System 100 may include a first body 101 and a second body 103. As described herein, the first body 101 and the second body 103 may be electrical devices that generate logical data. For example, the first body 101 and the second body 103 may be computers, servers, embedded systems, and the like. In some embodiments, the first body 101 may be a computing device mounted within an enclosure, such as a rack, and the second body 103 may be a computing device mounted within a bay associated with the enclosure containing the first body 101.

In additional embodiments, the first body 101 may be in communication with the second body 103. For example, as described above, the first body 101 may be in an enclosure and the second body 103 may be in a bay associated with the enclosure. To facilitate communication between the first body 101 and the second body 103, the first body 101 and the second body 103 may be connected to one another through a differential interface 111. As used herein, a differential interface 111, may refer to an interface between two separate bodies that allows the separate bodies to electrically transmit a differential signal to one another, the differential signal using at least one pair of complementary signals that are transmitted through separate wires. Typically, the separate wires may be a twisted pair of wires.

In certain embodiments, when the first body 101 communicates with the second body 103 through the differential interface 111, the first body 101 may include a first logic driver 105 that generates logical data for transmission to the second body 103 and processes logical data received from the second body 105. When transmitting logical data, the first logic driver 105 may generate a logic signal for transmission of the logical data through a first transmitter 121. Also, the first logic driver 105 may receive a logic signal through a first receiver 123. To aid in transmitting and receiving logic signals from other bodies, the first logic driver 105 may be coupled to a first transceiver within the first body 101.

As shown, the first transceiver may include a first transmitting amplifier 113 and a first receiving amplifier 115. The first transmitting amplifier 113 amplifies the logic signal transmitted from the first logic driver 105 for transmission to other bodies through the differential interface 111. For example, the first transmitting amplifier 113 may receive a generated logic signal from the first logic driver 105. Additionally, the first transmitting amplifier 113 may amplify the logic signal. Then, the first transmitting amplifier 113 may provide the amplified logic signal and an inverted amplified logic signal to the differential interface 111. Similarly, the first receiving amplifier 115 amplifies a received differential pair of logic signals for processing by the first logic driver 105. Additionally, the first receiving amplifier 115 may amplify a first signal in a differential pair and invert a second signal in the differential pair to create a single logic signal for reception through the first receiver 123 on the first logic driver 105. Accordingly, the first logic driver 105 may transmit and receive logic signals through the differential interface 111.

In additional embodiments, the second body 103 may include a second logic driver 107 that generates logical data for transmission to the first body 101 and processes received logical data from the first body 101. When transmitting logical data, the second logic driver 107 may generate a logic signal for transmission of logical data through a second transmitter 125. Also, the second logic driver 107 may receive a logic signal through a second receiver 127. To aid in transmitting and receiving logic signals from other bodies, the second logic driver 107 may be coupled to a second transceiver within the second body 103.

As shown, the second transceiver may include a second transmitting amplifier 117 and a second receiving amplifier 119. The second transmitting amplifier 117 amplifies the logic signal transmitted from the second logic driver 107 for transmission to other bodies through the differential interface 111. For example, the second transmitting amplifier 117 may receive a generated logic signal from the second logic driver 107. Additionally, the second transmitting amplifier 117 may amplify the logic signal. Then, the second transmitting amplifier 117 may provide the amplified logic signal and an inverted amplified logic signal to the differential interface 111. Similarly, the second receiving amplifier 119 amplifies a received differential pair of logic signals for processing by the second logic driver 107. Additionally, the second receiving amplifier 119 may amplify a first signal in a differential pair and invert a second signal in the differential pair to create a single logic signal for reception through the second receiver 127 on the second logic driver 107. Accordingly, the second logic driver 107 may transmit and receive logic signals through the differential interface 111.

In some embodiments, to facilitate the detection and decoding of logical data transmitted between the first body 101 and the second body 103, portions of the system 100 may share a ground reference. For example, the first logic driver 105 may include a first ground reference 133 and the second logic driver 107 may include a second ground reference 137. Additionally, the first ground reference 133 may be connected to the second ground reference 137 through a common ground connection 131.

In certain embodiments, the first ground reference 133 for the first logic driver 105 may be substantially different from the second ground reference 137 for the second logic driver 107. For example, when the first body 101 is an enclosure and the second body 103 is a bay outside of the enclosure, the first body 101 and the second body 103 may be unable to share a common ground reference and the first ground reference 133 and the second ground reference 137 may have a significant voltage difference. The difference in voltage between the first ground reference 133 and the second ground reference 137 may cause current to flow across the common ground connection 131 from the higher potential ground reference to the lower potential ground reference. If the difference is sufficiently large, the current through the common ground connection 131 may damage the common ground connection 131. Also, the difference in voltages at the first ground reference 133 and the second ground reference 137 may cause the signal voltage from one side to exceed the input voltage limit for a receiving side. If the input voltage is exceeded, the receiving side may be unable to recognize signal transitions, or the receiving side may be damaged. Thus, the voltage difference between the first ground reference 133 and the second ground reference 137 may cause poor signal quality and, in some extreme cases, cause circuit damage to electronics within one or both of the first body 101 and the second body 103 and connections between the first body 101 and the second body 103.

The result is called a ground loop. The logic ground reference between the two devices are connected together. Those two ground references may have a significant absolute voltage difference. If so then current wikll flow from the higher potential ground reference to the lower. IF there is sufficient difference the current can cause damage to the cable. Also it is possible that the reference difference can result in the signal voltage from one side exceeding the input voltage limit from the receiving side which can result in an inability to recognize signal transitions or even damage the receiving circuit.

Figure 2:
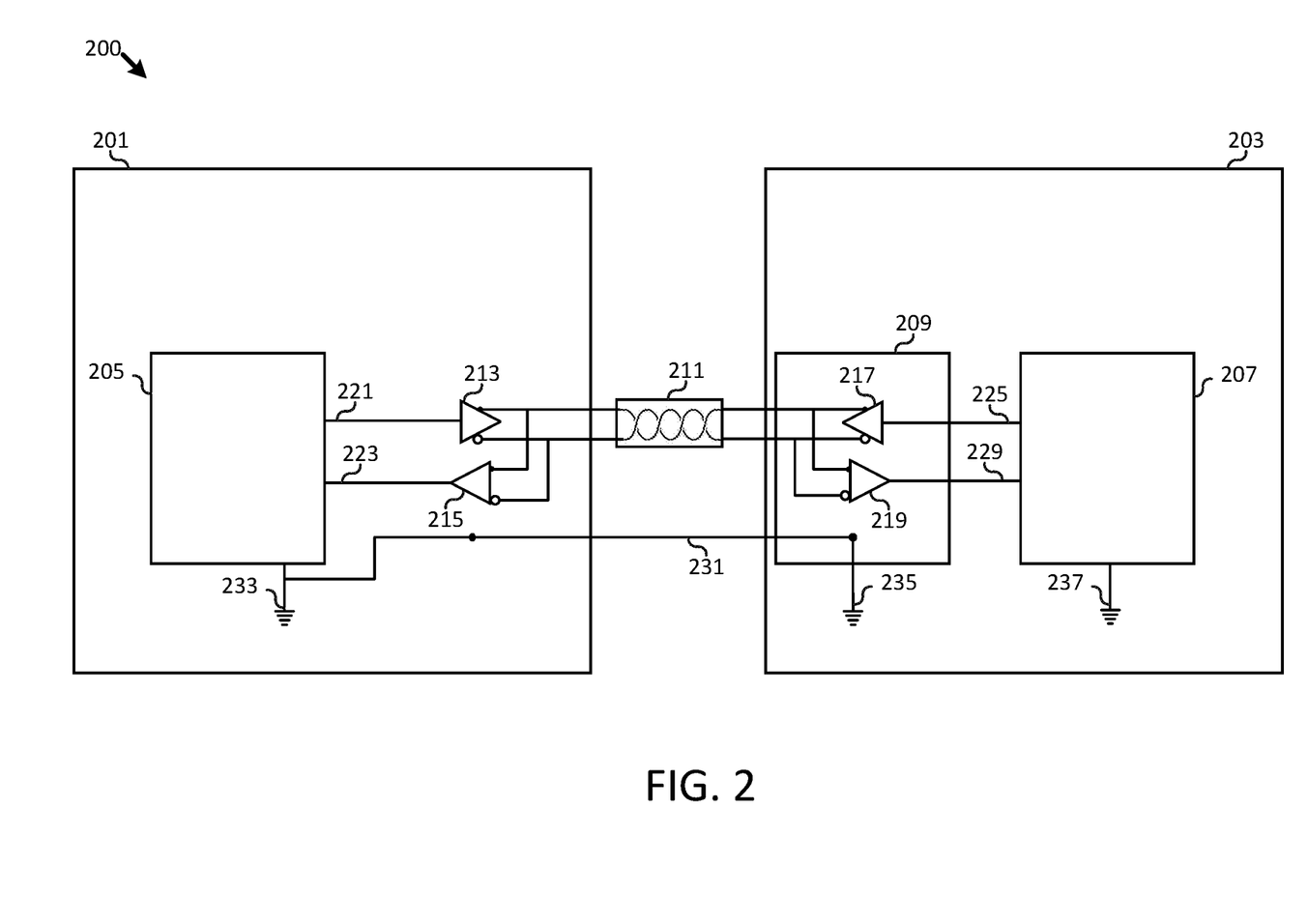
FIG. 2 is a schematic diagram of a further embodiment of a system for providing an isolation ground for a differential interface.

FIG. 2 is a schematic diagram of a system 200 for providing an isolation ground for a differential interface 211. System 200 is similar to the system 100. For example, the first body 201 and the second body 203 are similar to the first body 101 and the second body 103. Additionally, the first logic driver 205 and the second logic driver 207 function similarly to the first logic driver 105 and the second logic driver 107. However, the system 200 differs from the system 100 in that the second body 203 includes an isolated transceiver 209. As used herein, an isolated transceiver may refer to a transceiver having a ground reference that is isolated from the ground reference for the associated logic driver. For example, in the system 200, the second logic driver 207 and the isolated transceiver 209 have different ground references that are isolated from one another. In particular, the second logic driver 207 has a second ground reference 237 and the isolated transceiver 209 has an isolation ground 235.

In certain embodiments, when the second body 203 includes an isolated transceiver 209, the isolation ground 235 of the isolated transceiver 209 may be attached to a bus, the bus being attached to one or more isolated transceivers within the system 200. For example, the common ground connection 231 may function as the bus that is connected to one or more isolated transceivers within the system 200. The common ground connection 231 may also be connected to a ground reference for a single logic driver within the system 200. For example, the common ground connection 231 may be connected to the first ground reference 233 for the first logic driver 205. Accordingly, the first ground reference 233 functions as the ground for the one or more isolated transceivers within the system 200, as well as the ground reference for the transceiver in the first body 201.

In some embodiments, to transmit signals between the first body 201 and the second body 203, the first body 201 and the second body 203 function substantially similarly to the first body 101 and the second body 103 in FIG. 1, with the exception that the ground reference of the isolated transceiver 209 in the second body 203 is isolated from the second ground reference 237 of the second logic driver 207. Accordingly, when the first logic driver 205 sends a logic signal to the second logic driver 207, the first logic driver 205 transmits the logic signal through the first transmitter 221 to the first transmitting amplifier 213. The first transmitting amplifier 213 functions similarly to the first transmitting amplifier 113 in FIG. 1. As such, the first transmitting amplifier 213 receives the logic signal from the first transmitter 221 on a single input and outputs the amplified logic signal on two outputs through the differential interface 211, a first output being an amplified logic signal and the second output being an inverted amplified logic signal that is complementary to the first output. The differential interface 211 provides the amplified signals to the isolated transceiver 209 on the second body 203. The second receiving amplifier 219 within the isolated transceiver 209 may receive the logic signal and the inverted logic signal through the differential interface 211. Using the ground reference provided through the common ground connection 231, the second receiving amplifier 219 may provide a single logic signal to the second receiver 229 for use by the second logic driver 207.

In further embodiments, when transmitting signals from the second body 203 to the first body 201, the second logic driver 207 may transmit a logic signal through the second transmitter 225 to the second transmitting amplifier 217. The second transmitting amplifier 217 function similarly to the second transmitting amplifier 117 in FIG. 1. As such, the second transmitting amplifier 217 receives the logic signal from the second transmitter 225 on a single input and outputs the amplified logic signal on two outputs through the differential interface 211, one output being an amplified logic signal and the second output being an inverted amplified logic signal. The differential interface 211 provides the amplified signals to the first receiving amplifier 215 in the transceiver on the first body 201. In particular, the first receiving amplifier 215 may receive the logic signal and the inverted logic signal through the differential interface 211. Using the first ground reference 233 of the first logic driver 205, the first receiving amplifier 215 may provide a single logic signal to the first receiver 223 for use by the first logic driver 205.

Figure 3:
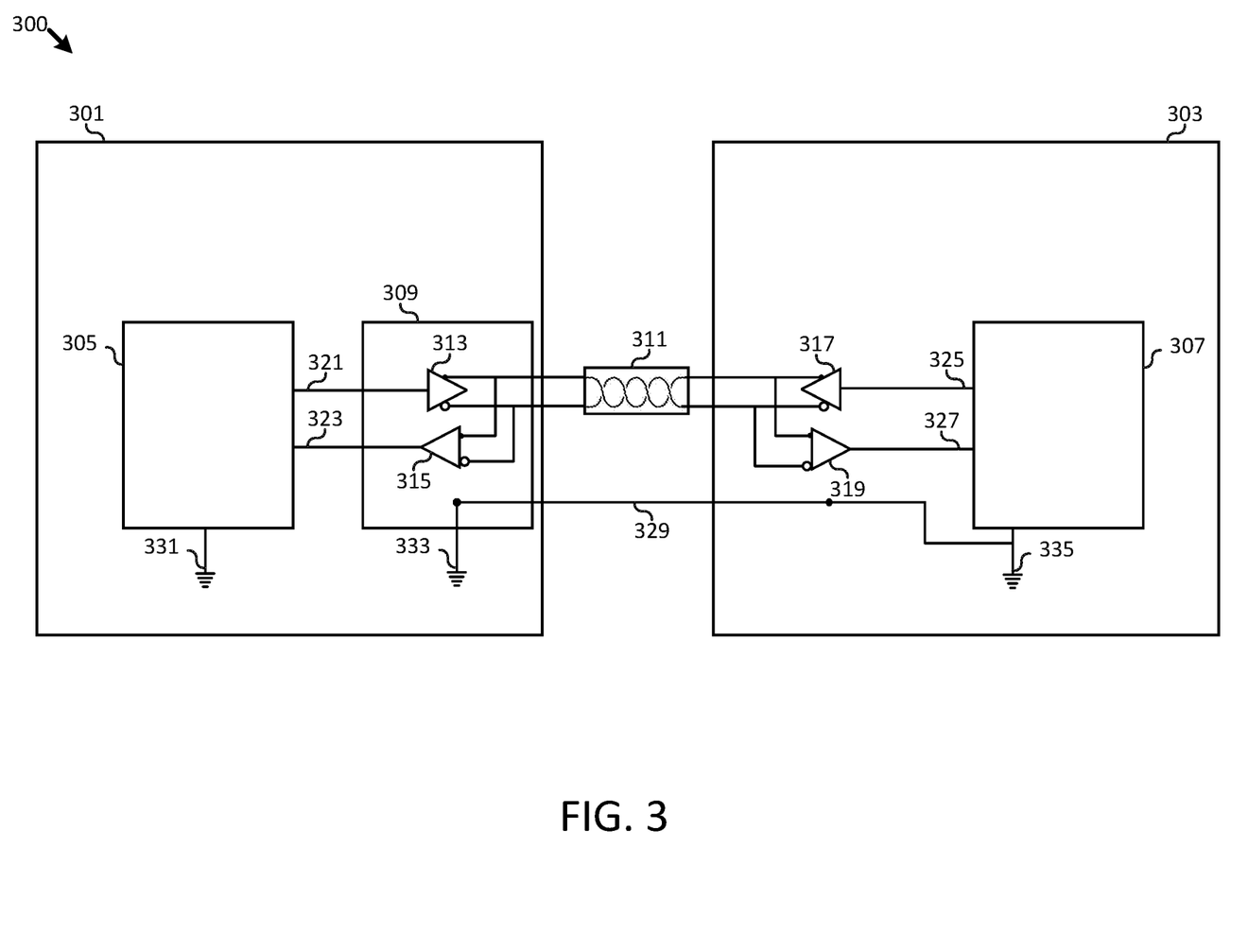
FIG. 3 is a schematic diagram of one embodiment of a system for providing a ground for a differential interface.

FIG. 3 is a schematic diagram of a system 300 for providing an isolation ground for a differential interface. System 300 is similar to the system 200. For example, the first body 301 and the second body 303 are similar to the first body 201 and the second body 203. Additionally, the first logic driver 305 and the second logic driver 307 function similarly to the first logic driver 205 and the second logic driver 207. However, the system 300 differs from the system 200 in that the first body 301 includes an isolated transceiver 309 in a similar manner to the second body 203 including the isolated transceiver 209 in FIG. 2. For example, in the system 300, the first logic driver 305 has a first ground reference 331 and the isolated transceiver 309 has an isolation ground 333.

In certain embodiments, when the first body 301 includes an isolated transceiver 309, the isolation ground 333 of the isolated transceiver 309 may be attached to a bus, the bus being attached to one or more isolated transceivers within the system 300. For example, the common ground connection 329 may function as a bus that is connected to one or more isolated transceivers within the system 300. The common ground connection 329 may also be connected to a ground reference for a single logic driver within the system 300. For example, the common ground connection 329 may be connected to the second ground reference 335 for the second logic driver 307. Accordingly, the second ground reference 335 functions as the ground for the one or more isolated transceivers within the system 300, as well as the ground reference for the transceiver in the second body 303.

In some embodiments, to transmit signals between the first body 301 and the second body 303, the first body 301 and the second body 303 function substantially similarly to the first body 201 and the second body 203 in FIG. 2, with the exception that the ground reference of the isolated transceiver 309 in the first body 301 is isolated from the first ground reference 331 of the first logic driver 305. Accordingly, when the first logic driver 305 sends a logic signal to the second logic driver 307, the first logic driver 305 transmits a logic signal through the first transmitter 321 to the first transmitting amplifier 313. The first transmitting amplifier 313 functions similarly to the first transmitting amplifier 213 in FIG. 2. As such, the first transmitting amplifier 313 receives the logic signal from the first transmitter 321 on a single input and outputs the amplified logic signal on two outputs through the differential interface 311, one output being an amplified logic signal and the second output being an inverted amplified logic signal. The differential interface 311 provides the amplified signals to the second receiving amplifier 319 on the second body 303. The second receiving amplifier 319 may receive the logic signal and the inverted logic signal through the differential interface 311. Using the second ground reference 335, the second receiving amplifier 319 may provide a single logic signal to the second receiver 327 for use by the second logic driver 307.

In further embodiments, when transmitting signals from the second body 303 to the first body 301, the second logic driver 307 may transmit a logic signal through the second transmitter 325 to the second transmitting amplifier 317. The second transmitting amplifier 317 may function similarly to the second transmitting amplifier 217 in FIG. 2. As such, the second transmitting amplifier 317 receives the logic signal from the second transmitter 325 on a single input and outputs the amplified logic signal on two outputs through the differential interface 311, one output being an amplified logic signal and the second output being an inverted amplified logic signal. The differential interface 311 provides the amplified signals to the first receiving amplifier 315 in the isolated transceiver 309 on the first body 301. In particular, the first receiving amplifier 315 may receive the logic signal and the inverted logic signal through the differential interface 311. Using the second ground reference 335 of the second logic driver 307 provided through the common ground connection 329, which is connected to the isolation ground 333, the first receiving amplifier 315 may provide a single logic signal to the first receiver 323 for use by the first logic driver 305.

In some embodiments, systems may include a combination of the second body 203 and the second body 303. For example, a system may include multiple input/output bays connected to a single enclosure. If the enclosure is similar to the first body 301, having the isolated transceiver 309, the enclosure may be unable to provide proper grounding when connected to components similar to the second body 203. Conversely, if the enclosure is similar to the first body 201, the enclosure may be unable to provide proper grounding when connected to components similar to the second body 303. Accordingly, to provide proper grounding, different components of the second body 203 or the second body 303 may be replaced depending on whether they are connected to a first body 201 or a first body 301. However, replacing components within a system may be unduly expensive.

Figure 4:
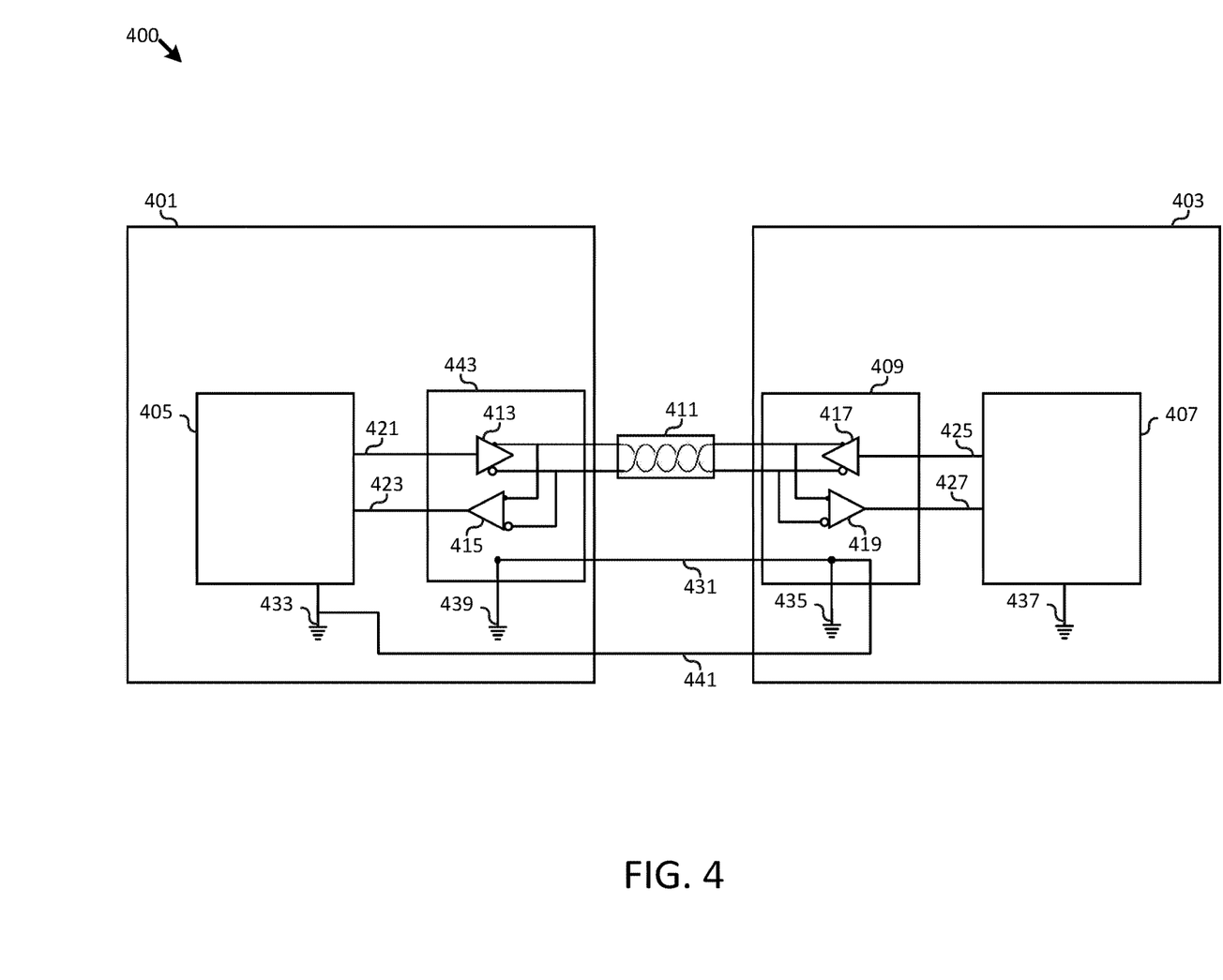
FIG. 4 is a schematic diagram of one embodiment of a system for providing adaptive selection of an isolation ground for a differential interface.

FIG. 4 is a schematic diagram of a system 400 for providing adaptive selection of an isolation ground for a differential interface. The system 400 may include a first body 401 and a second body 403. The first body 401 may be substantially similar to the first body 301 described above in FIG. 3. In particular, the first body 401 includes a first isolated transceiver 443, where the first isolated transceiver 443 functions similarly to the isolated transceiver 309 in FIG. 3. Additionally, the second body 403 may be substantially similar to the second body 203 described above in FIG. 2. In particular, the second body 403 includes a second isolated transceiver 409, or the second isolated transceiver 409 functions similarly to the isolated transceiver 209 in FIG. 2.

In additional embodiments, the first logic driver 405, the first transmitter 421, the first receiver 423, the first ground reference 433, the first transmitting amplifier 413, the first receiving amplifier 415, and the first isolation ground 439 respectively function similar to the first logic driver 305, the first transmitter 321, the first receiver 323, the first ground reference 331, the first transmitting amplifier 313, the first receiving amplifier 315, and the isolation ground 333 of FIG. 3. Likewise, the second logic driver 407, the second transmitter 425, the second receiver 427, the second ground reference 437, the second transmitting amplifier 417, the second receiving amplifier 419, and the second isolation ground 435 respectively function similar to the second logic driver 207, the second transmitter 225, the second receiver 229, the second ground reference 237, the second transmitting amplifier 217, the second receiving amplifier 219, and the isolation ground 235 of FIG. 2. Additionally, the differential interface 411 function similarly to the differential interface 111 of FIG. 1.

In certain embodiments, as both the first body 401 and the second body 403 respectively include the first isolated transceiver 443 and the second isolated transceiver 409, the first isolated transceiver 443 and the second isolated transceiver 409 may also respectively include a first isolation ground 439 and a second isolation ground 435. In some embodiments, the first isolation ground 439 and the second isolation ground 435 may be connected to one another through a common ground connection 431. However, as the first isolated transceiver 443 is isolated from the first logic driver 405 and the second isolated transceiver 409 is isolated from the second logic driver 407, the first isolation ground 439 and the second isolation ground 435 may be coupled to one of the first ground reference 433 and the second ground reference 437 to facilitate the encoding and decoding of the signals transmitted across the differential interface 411 such that the logic signals can be received by the first logic driver 405 and the second logic driver 407.

In some embodiments, to facilitate the connection of the first isolation ground 439 and the second isolation ground 435 to one of the first ground reference 433 and the second ground reference 437, the system 400 may include an adaptive isolation connection 441 connected between the first body 401 and the second body 403. As used herein, the adaptive isolation connection 441 may be an additional connection between two bodies that adaptively connects isolation grounds to one of the ground references for the two connected bodies. For example, when the first body 401 includes an isolated transceiver 443 and the second body 403 includes an isolated transceiver 409, the adaptive isolation connection 441 may be connected to the first ground reference 433 and to the second isolation ground 435 in the second body 403. Accordingly, the first isolation ground 439 and the second isolation ground 435 may be connected to the first ground reference 433 through the adaptive isolation connection 441.

In further embodiments, to provide an adaptive isolation connection 441, both the first body 401 and the second body 403 may include an additional pin or connector for connecting to an adaptive isolation connection 441. The pin that connects to the adaptive isolation connection 441 in the first body 401 may provide an electrical connection to the first ground reference 433. Also, the pin that connects to the adaptive isolation connection 441 in the second body 403 may provide an electric connection to the second isolation ground 435. The adaptive isolation connection 441 may be part of a cable that includes the differential interface 411 and the common ground connection 431. For example, an RJ-45 cable may connect the first body 401 to the second body 403, where two wires of the ethernet cable are used for providing the differential interface 411, an additional wire is used for providing the common ground connection 431, and another wire may provide the adaptive isolation connection 441. Additionally, the separate connections may be provided by any cable having a sufficient number of wires. For example, an ethernet cable, a telephone cable, a USB cable, an HDMI cable, and the like. Alternatively, the adaptive isolation connection 441 may be provided by a dedicated cable. By providing an adaptive isolation connection 441, the first ground reference 433 may provide a ground reference to the second isolated transceiver 409.

Figure 5:
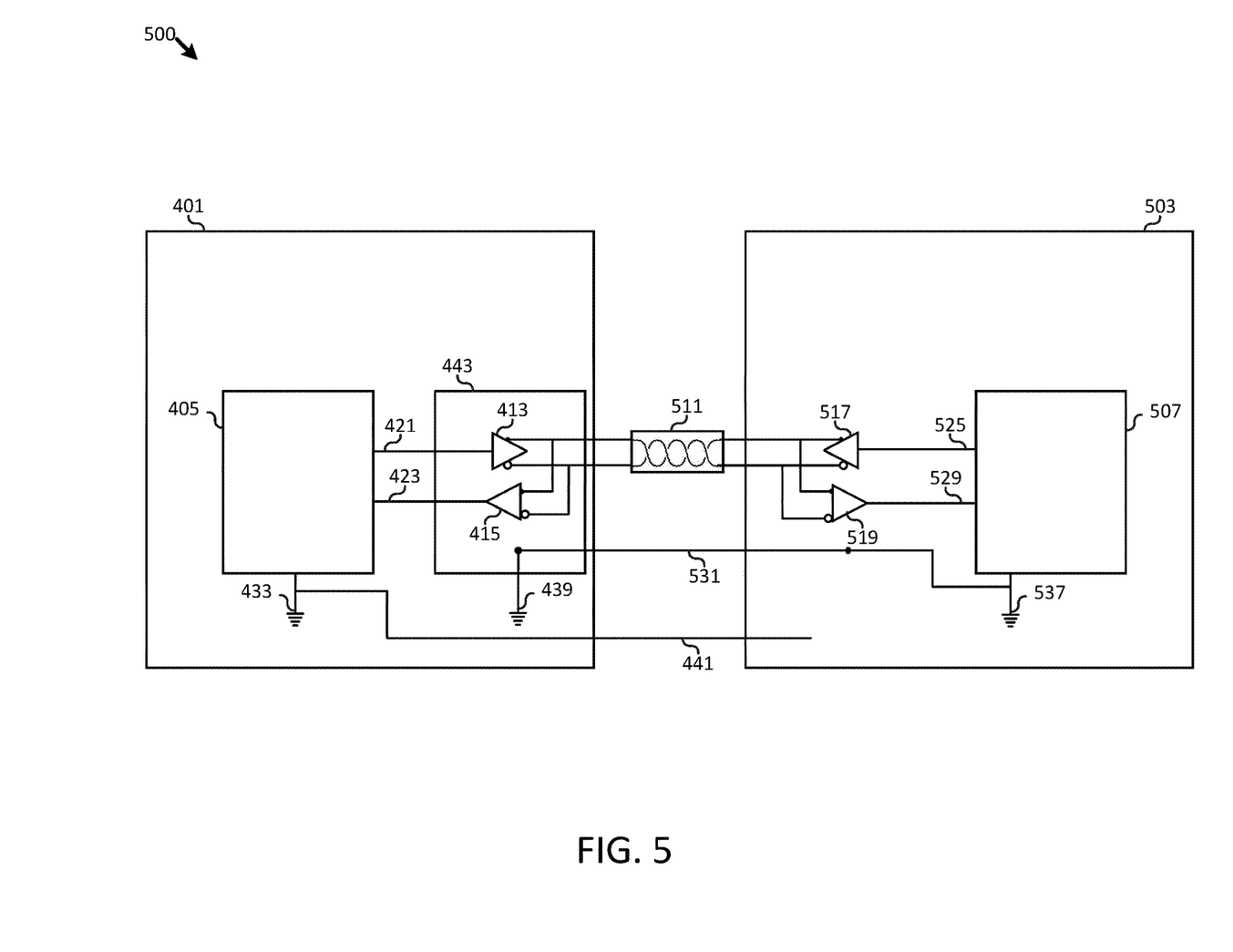
FIG. 5 is a schematic diagram of a further embodiment of a system for providing adaptive selection of an isolation ground for a differential interface.

FIG. 5 is a schematic diagram of an additional system 500 for providing adaptive selection of an isolation ground for a differential interface. The system 500 may include a first body 401 that is substantially described above with respect to FIG. 4. As described above, the first body 401 may include a first logic driver 405 that communicates with a second logic driver 507 in a second body 503. The second body 503 may include the second logic driver 507, a second transmitter 525, a second receiver 529, a second transmitting amplifier 517, a second receiving amplifier 519, and a second ground reference 537, which respectively function similar to the second logic driver 307, the second transmitter 325, the second receiver 327, the second transmitting amplifier 317, the second receiving amplifier 319, and the second ground reference 335 described above in FIG. 3. In particular, the second body 303 does not have an isolated transceiver like the first body 401.

In certain embodiments, as the second body 503 does not have an isolated transceiver, the transceiver that includes the second transmitting amplifier 517 and the second receiving amplifier 519 may be grounded through the second ground reference 537. Accordingly, to facilitate communication with the first logic driver 405 in the first body 401, the first isolation ground 439 of the first isolated transceiver 443 may also be connected to the second ground reference 537 through a shared common ground connection 531. Accordingly, the first isolation ground 439 for the first isolated transceiver 409 may be grounded through the second ground reference 537 through the common ground connection 531 instead of being connected to the first ground reference 433. Additionally, the adaptive isolation connection 441 may be disconnected within the second body 503.

As discussed above with respect to FIGS. 4 and 5, the first body 401 may connect to multiple types of second bodies 403 and 503 through a respective differential interface 411 and 511, a respective common ground connection 431 and 531, and an adaptive isolation connection 441. As illustrated, the first ground reference 433 may be connected to the adaptive isolation connection 441 and isolated from the first isolated transceiver 443. As shown, the adaptive isolation connection 441 may allow the first body 401 to connect to multiple types of second bodies 403 and 503. For example, in a second body 403 having a second isolated transceiver 409, the adaptive isolation connection 441 may connect to the second isolated ground of the second isolated transceiver 409. Alternatively, in a second body 503 that does not have an isolated transceiver, the adaptive isolation connection 441 may be disconnected within the second body 503. Accordingly, a first body 401 having an adaptive isolation connection 441 may provide proper grounding for both a second body 403 having a second isolated transceiver 409 and a second body 503 lacking an isolated transceiver. Thus, by using an adaptive isolation connection 441, the system 400 or 500 may have proper grounding without having to replace multiple components to be compatible with one another.

Figure 6:
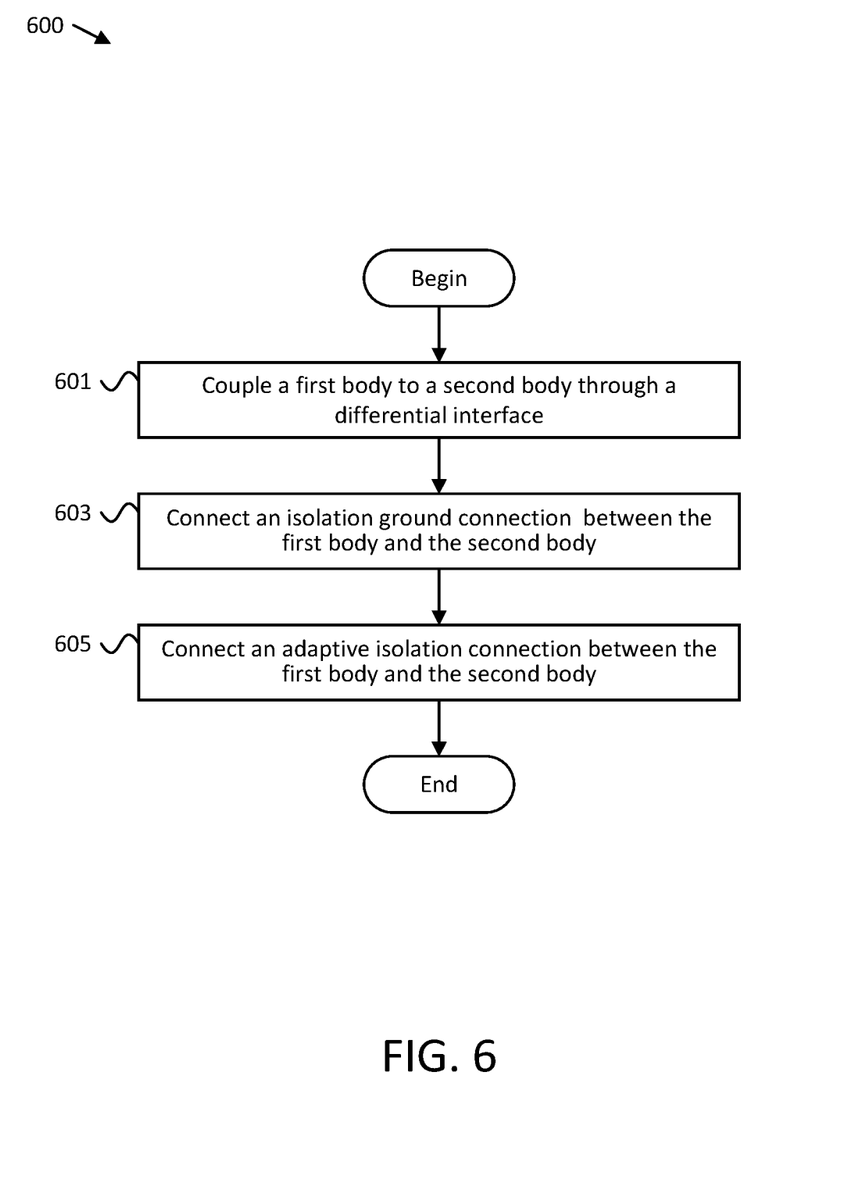
FIG. 6 is a flowchart diagram illustrating one embodiment of a method for providing adaptive selection of an isolation ground for a differential interface.

FIG. 6 is a flowchart diagram illustrating a method 600 for providing adaptive selection of an isolation ground for a differential interface. Method 600 proceeds at 601 where a first body 401 is coupled to a second body 403 or 503 through a differential interface 411 or 511. In some implementations, the first body 401 may have a first ground reference 433 and the second body 403 or 503 may have a second ground reference 437 or 537. Additionally, method 600 proceeds at 603 where a common ground connection 431 or 531 is connected between the first body 401 and the second body 403 or 503. For example, the common ground connection 431 or 531 may connect a first isolation ground 439 to a second isolation ground 435 of a second isolated transceiver 409 or to the second ground reference 437. Further, method 600 proceeds at 605 where an adaptive isolation connection 441 is connected between the first body 401 and the second body 403 or 503. For example, the adaptive isolation connection 441 may adaptively connects the common ground connection 431 to one of the first ground reference 433 and the second ground reference 437. Method 600 then ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
    a first body having a first ground reference;
    a second body having a second ground reference;
    a differential interface through which the first body communicates electrical signals with the second body;
    a common ground connection shared between the first body and the second body; and
    an adaptive isolation connection that adaptively connects the common ground connection to one of the first ground reference and the second ground reference.

2. The system of claim 1, wherein the first body is an enclosure.

3. The system of claim 2, wherein the second body is an input/output bay.

4. The system of claim 1, wherein the first body comprises:
    a first logic driver connected to the first ground reference; and
    a first isolated transceiver connected to the differential interface, wherein the first isolated transceiver is isolated from the first ground reference and connected to the common ground connection.

5. The system of claim 4, wherein the second body comprises:
    a second logic driver connected to the second ground reference; and
    a second transceiver that is connected to the common ground connection.

6. The system of claim 5, wherein the second transceiver is a second isolated transceiver that is isolated from the second ground reference, wherein the common ground connection is connected to the adaptive isolation connection within the second body.

7. The system of claim 5, wherein the common ground connection is connected to the second ground reference and the adaptive isolation connection is disconnected within the second body.

8. The system of claim 1, wherein the differential interface, the common ground connection, and the adaptive isolation connection are part of a cable.

9. The system of claim 8, wherein the cable is one of:
    an Ethernet cable; and
    a telephone cable.

10. The system of claim 1, wherein the adaptive isolation connection and the differential interface are on separate cables.

11. A method comprising:
    coupling a first body to a second body through a differential interface, wherein the first body has a first ground reference and the second body has a second ground reference;
    connecting a common ground connection between the first body and the second body; and
    connecting an adaptive isolation connection between the first body and the second body, wherein the adaptive isolation connection adaptively connects the common ground connection to one of the first ground reference and the second ground reference.

12. The method of claim 11, wherein the first body is an enclosure.

13. The method of claim 12, wherein the second body is an input/output bay.

14. The method of claim 11, further comprising:
    coupling a first logic driver in the first body to the first ground reference; and
    coupling a first isolated transceiver in the first body to the differential interface;
    isolating the first isolated transceiver from the first ground reference; and
    connecting the first isolated transceiver to the common ground connection.

15. The method of claim 14, further comprising:
    coupling a second logic driver in the second body to the second ground reference; and
    connecting a second transceiver in the second body to the common ground connection.

16. The method of claim 15, further comprising:
    isolating the second transceiver from the second ground reference; and
    connecting the common ground connection to the adaptive isolation connection within the second body.

17. The method of claim 15, further comprising:
    connecting the common ground connection to the second ground reference; and
    ensuring that the adaptive isolation connection is disconnected within the second body.

18. The method of claim 11, wherein the differential interface, the common ground connection, and the adaptive isolation connection are part of a cable.

19. The method of claim 11, wherein the adaptive isolation connection and the differential interface are on separate cables.

20. A system comprising:
    an enclosure having a first ground reference;
    an input/output bay having a second ground reference;
    a differential interface through which the enclosure communicates electrical signals with the input/output bay;
    a common ground connection shared between the enclosure and the input/output bay; and an adaptive isolation connection that adaptively connects the common ground connection to one of the first ground reference and the second ground reference.

* * * * *